United States Patent [19]
Suzuki

[11] Patent Number: 6,157,767
[45] Date of Patent: Dec. 5, 2000

[54] COLOR IMAGE SIGNAL FRAME PROCESSING AND RECORDING APPARATUS UTILIZING IDENTIFICATION SIGNALS

[75] Inventor: Koichiro Suzuki, Kawasaki, Japan

[73] Assignee: Canon Kabushiki Kaisha, Tokyo, Japan

[21] Appl. No.: 08/824,792

[22] Filed: Mar. 26, 1997

[30] Foreign Application Priority Data

Mar. 28, 1996 [JP] Japan ................................ 8-097377

[51] Int. Cl.[7] ........................................ H04N 9/79
[52] U.S. Cl. ................................. 386/1; 386/38
[58] Field of Search .................... 386/1, 31–32, 386/37, 38, 40, 44, 45; H04N 9/79

[56] References Cited

U.S. PATENT DOCUMENTS

| | | | |
|---|---|---|---|
| 3,502,795 | 3/1970 | Camras | 386/32 |
| 3,529,080 | 9/1970 | Nassimbene | 386/32 |
| 4,642,680 | 2/1987 | Yamada | 358/78 |
| 4,868,679 | 9/1989 | Kanamaru | 386/32 |
| 5,283,659 | 2/1994 | Akiyama et al. | 386/37 |
| 5,647,020 | 7/1997 | Mitsuhashi et al. | 382/162 |

*Primary Examiner*—Thai Tran
*Attorney, Agent, or Firm*—Fitzpatrick, Cella, Harper & Scinto

[57] ABSTRACT

A color image signal recording apparatus has a unit for forming a plurality type of component signals constituting a color image signal, a unit for generating an identification signal for identifying each of the plurality type of component signals, and a recording unit for recording each of the plurality type of component signals constituting the color image signal of the same frame on a recording medium by a plurality of frames. The apparatus can record a color image signal, has high reliability, and is suitable for printing.

21 Claims, 2 Drawing Sheets

COLOR IMAGE SIGNAL FRAME PROCESSING AND RECORDING APPARATUS UTILIZING IDENTIFICATION SIGNALS

BACKGROUND OF THE INVENTION

1. Field of the Invention

The present invention relates to a color image signal processing and recording apparatus, and more particularly to a color image signal processing and recording apparatus capable of recording a very fine color still image.

2. Related Background Art

Recording/reproducing apparatuses used in general fields, such as video tape recorders in home use, are undergoing digitalization in order to improve the image quality, prevent deterioration of images themselves, and record images together with various types of data. A method of recording/reproducing images in units of several frames has also been proposed in order to record/reproduce a still image by using such a recording/reproducing apparatus.

Conventional techniques are, however, associated with the following problems. A conventional recording/reproducing apparatus uses a specific format when a moving image is recorded or reproduced. This format brings about disadvantages that the bandwidth of color signals of an image is narrow and that the image quality is lowered because the image data is compressed to reduce the total amount of a number of image data sets. Therefore, the quality of a print-out image is unsatisfactory.

SUMMARY OF THE INVENTION

It is an object of the present invention to solve the above problems.

It is another object of the present invention to provide a highly reliable apparatus capable of recording a color image signal suitable also for printing and the like.

In order to achieve the above objects, according to one aspect of the present invention, there is provided a color image signal recording apparatus which comprises: forming means for forming a plurality of component signals constituting a color image signal; generating means for generating an identification signal for identifying each of the plurality of component signals; and recording means for recording each of the plurality of component signals constituting the color image signal of the same frame on a recording medium by a plurality of frames.

It is a further object of the present invention to provide a color image signal processing apparatus capable of giving a sufficient quality of a print-out image of a photographed subject.

In order to achieve the above object, according to another aspect of the present invention, there is provided a color image signal processing apparatus comprising: image pickup means for photoelectrically converting a subject image and forming a plurality of component signals constituting a color image signal; generating means for generating an identification signal for identifying each of the plurality of component signals; storing means for storing the plurality of component signals constituting the color image signal of the same frame in a storage unit; and outputting means for outputting the plurality of component signals stored in the storage unit to a printer without converting the plurality of component signals into other types of component signals.

The other objects and features of the invention will become apparent from the following detailed description of the embodiments of this invention when read in conjunction with the accompanying drawings.

DETAILED DESCRIPTION OF THE PREFERRED EMBODIMENTS

Preferred embodiments of the present invention will be described with reference to the accompanying drawings.

Figure 1:
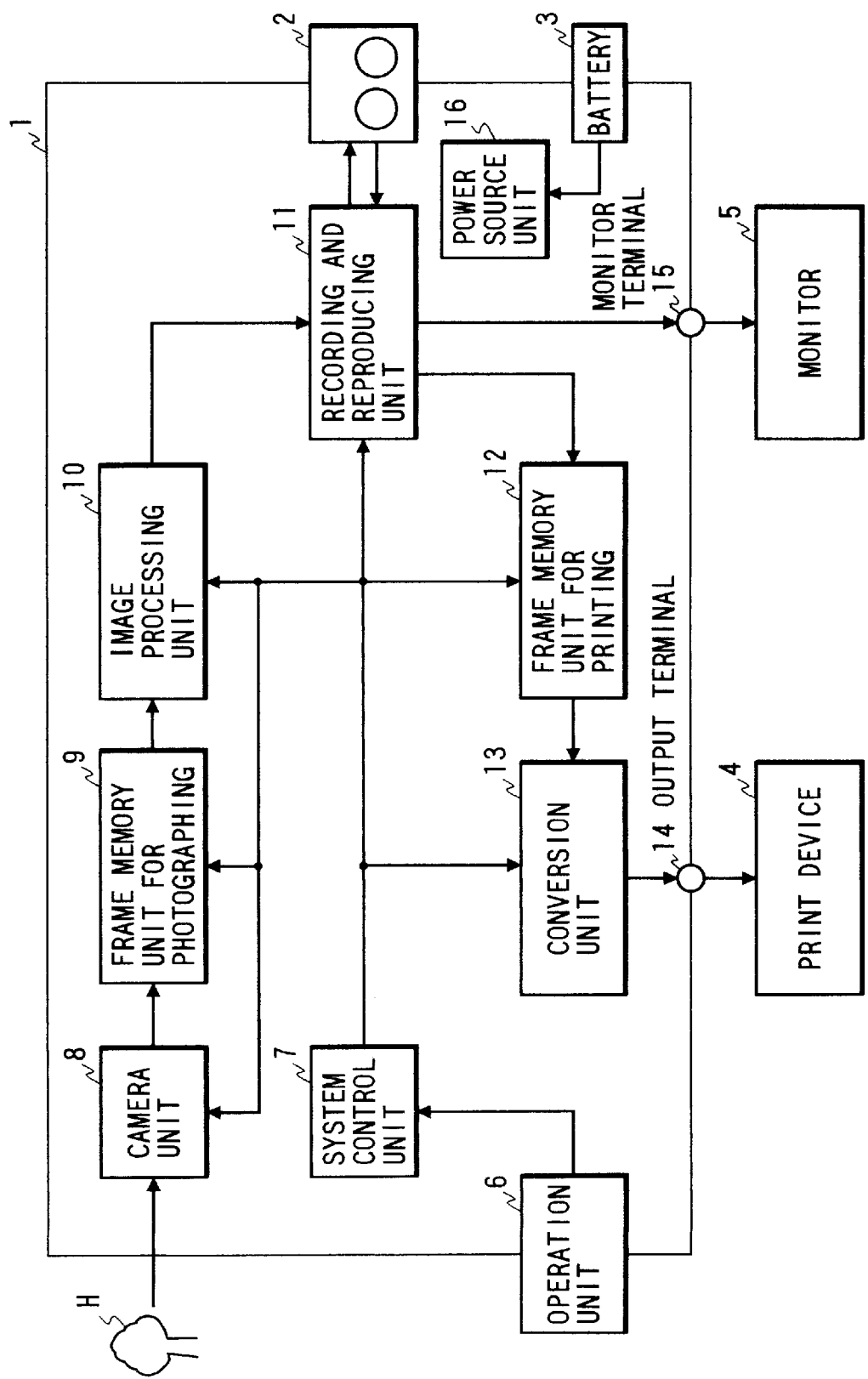
FIG. 1 is a block diagram of an image signal processing apparatus according to an embodiment of the invention.

FIG. 1 is a block diagram of a recording/reproducing apparatus according to an embodiment of the present invention. The recording/reproducing apparatus has a main body 1, a magnetic tape 2, a battery 3, a print device 4, a monitor 5, an operation unit 6, a system control unit 7, a camera unit 8, a frame memory unit 9 for photographing, an image processing unit 10, a recording and reproducing unit 11, a frame memory unit 12 for printing, a conversion unit 13, an output terminal 14, a monitor terminal 15 and a power source unit 16.

The structure of each component of the apparatus will be described in detail. Mounted on and in the apparatus main body 1 are the magnetic tape 2, battery 3, operation unit 6, system control unit 7, camera unit 8, photographing frame memory unit 9, image processing unit 10, recording and reproducing unit 11, printing frame memory unit 12, conversion unit 13, output terminal 14, monitor terminal 15 and power source unit 16. The magnetic tape is a medium for recording/reproducing image data of a subject H photographed with the camera unit 8, The battery 3 is a power source for driving the whole of the recording/reproducing apparatus.

The print device 4 is connected via the output terminal 14 to the apparatus main body 1 and prints out an image in accordance with a print sequence to be described later. The monitor 5 is connected via the monitor terminal 15 to the apparatus main body 1 and displays a color still image, for example.

The operation unit 6 has various keys (not shown) such as an image pickup key, a search key, a next search key and a print key, in order for an operator to give the recording/reproducing apparatus various instructions such as a record operation, a reproduction operation, a search operation and a print operation. The system control unit 7 gives various instructions to be described later in accordance with a predetermined control sequence, to the camera unit 8, photographing frame memory unit 9, image processing unit 10, recording and reproducing unit 11, printing frame memory unit 12 and conversion unit 13.

The camera unit 8 has color separation filters of three colors including red (R), green (G) and blue (B) and photographs a subject H. The photographing frame memory unit 9 stores an image of one frame photographed with the camera unit 8, in the form of red component signals, green component signals and blue component signals. The image processing unit 10 generates a luminance signal (Y) and color difference signals (I, Q) red, green and blue component signals or selects them, and executes other processes. The recording and reproducing unit 11 affixes a mark (to be later described) to an image sent from the image processing unit 10 and records them on the magnetic tape, or reproduces an image signal with a mark from the magnetic tape.

The printing frame memory unit 12 stores an image signal of one frame sent from the recording and reproducing unit 11, the image signal containing red, green and blue component signals. The conversion unit 13 converts an image signal sent from the printing frame memory unit 12 into a print code. The print device is connected to the output terminal 14. The monitor 5 is connected to the monitor terminal 15. The power source unit 16 stabilizes power supplied from the battery 3 and distributes it to each component of the recording/reproducing apparatus.

Figure 2:
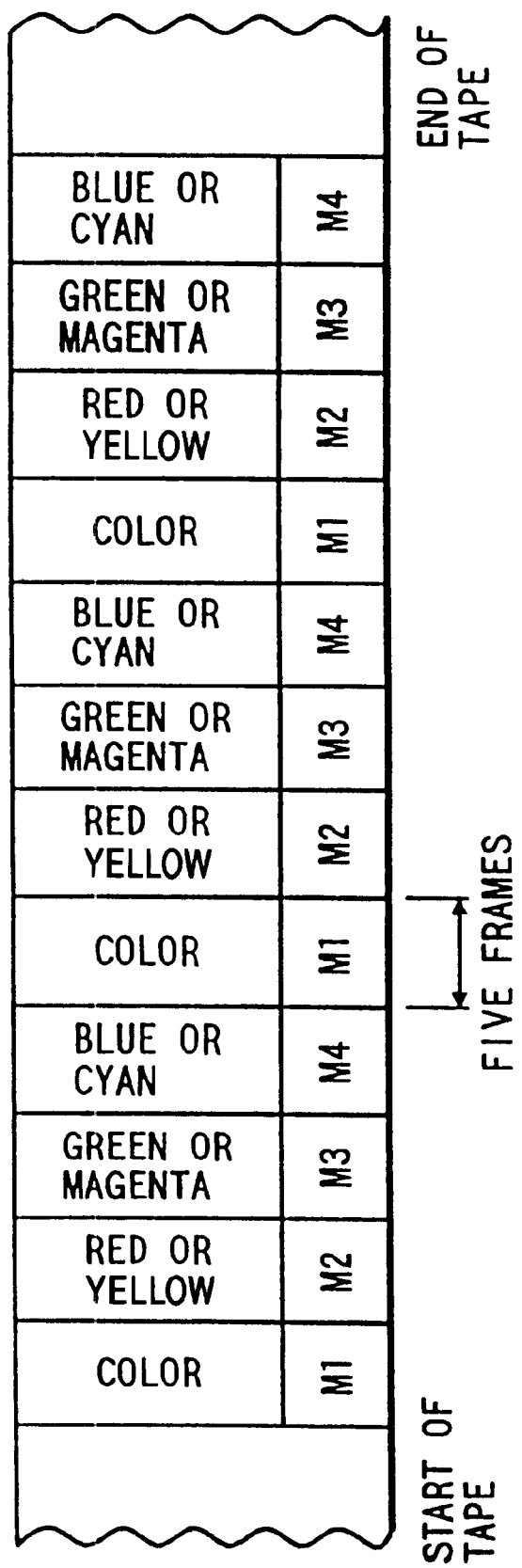
FIG. 2 is a diagram showing the format of a signal recorded on a magnetic tape with the apparatus shown in FIG. 1.

FIG. 2 is a diagram showing a format of image data recorded on the magnetic tape with the recording/reproducing apparatus of the present embodiment. Referring to FIG. 2, color image data is affixed with a mark M1, red component image data is affixed with a mark M2, green component image data is affixed with a mark M3, and blue component image data is affixed with a mark M4. According to the aspect of this embodiment, image data is encoded (compressed) with high efficiency through a discrete cosine transform of JPEG or the like, and the compressed image data of each color is affixed with a specific mark (identification information) representative of each color and recorded on the magnetic tape by a predetermined number of consecutive frames.

Next, the record operation of the recording/reproducing apparatus of this embodiment constructed as above will be described.

Upon depression of the image pickup key of the operation unit of the recording/reproducing apparatus by an operator, the system control unit 7 sends an image pickup instruction to the camera unit 8. The camera unit 8 photoelectrically converts a pickup image of the subject H to form an image signal, using the red, green and blue color separation filters. The image signal is a combination of the red, green and blue component signals. This image signal is sent to the photographing frame memory unit 9.

Next, the system control unit 7 sends a write instruction to the photographing frame memory unit 9. The photographing frame memory unit 9 stores the image signal of one frame sent from the camera unit 8. Next, the system control unit 7 sends a read instruction to the photographing frame memory unit 9. The photographing frame memory unit 9 reads the stored image signal of one frame and sends it to the image processing unit 10.

The system control unit 7 then sends a luminance and color signal generating instruction to the image processing unit 10. The image processing unit 10 generates a luminance signal and color signals from the red, green, and blue component signals and sends them to the recording and reproducing unit 11. The system control unit 7 then sends a five-frame recording instruction to the recording and reproducing unit 11. In response to this, the recording and reproducing unit 11 starts to record with the mark M1 an image signal sent from the image processing unit 10 and stops recording when five frames have been recorded.

Next, the system control unit 7 sends an instruction to make the image processing unit 10 select the red component signal as the luminance signal. In response to this, the image processing unit 10 generates the red component signal as the luminance signal and invalid signals as the color signals, and sends them to the recording and reproducing unit 11. The system control unit 7 then sends the five-frame recording instruction to the recording and reproducing unit 11. The recording and reproducing unit 11 starts to record with the mark M2 an image signal sent from the image processing unit 10 and stops recording when five frames have been recorded.

Next, the system control unit 7 sends an instruction to make the image processing unit 10 select the green component signal as the luminance signal. The image processing unit 10 generates the green component signal as the luminance signal and invalid signals as the color signals, and sends them to the recording and reproducing unit 11. The system control unit 7 then sends the five-frame recording instruction to the recording and reproducing unit 11. In response to this, the recording and reproducing unit 11 starts to record with the mark M3 an image signal sent from the image processing unit 10 and stop recording when five frames have been recorded.

Next, the system control unit 7 sends an instruction to make the image processing unit 10 select the blue component signal as the luminance signal. The image processing unit 10 generates the blue component signal as the luminance signal and invalid signals as the color signals, and sends them to the recording and reproducing unit 11. The system control unit 7 then sends the five-frame recording instruction to the recording and reproducing unit 11. In response to this, the recording and reproducing unit 11 starts to with the mark M4 an image signal sent from the image processing unit 10 and stops recording when five frames have been recorded.

The search operation of the recording/reproducing apparatus of the present embodiment will be described next.

Upon depression of the search key of the operation unit 6 of the recording/reproducing apparatus by an operator, the system control unit 7 sends a magnetic tape rewinding instruction to the recording and reproducing unit 11. The recording and reproducing unit 11 rewinds the magnetic tape 2 to the start point thereof.

The system control unit 7 then sends a mark M1 search instruction to the recording and reproducing unit 11. In response to this, the recording and reproducing unit 11 starts a magnetic tape reproduction operation, and temporarily stops this operation when the mark M1 is detected from the magnetic tape 2. At this time, since the color still image is sent from the recording and reproducing unit 11 to the monitor 5 via the monitor terminal 15, the operator can confirm the still image on the monitor 5. If the still image is not a desired one, the operator then depresses the next search key to continue the search operation.

Upon depression of the next search key of the operation unit 6 of the recording/reproducing apparatus by the operator, the system control unit 7 sends a mark M1 search instruction to the recording and reproducing unit 11. The recording and reproducing unit 11 starts a magnetic tape reproduction operation, and temporarily stops this operation when the mark M1 is detected from the magnetic tape 2. At this time, since the color still image is sent from the recording and reproducing unit 11 to the monitor 5 via the monitor terminal 15, the operator can confirm the still image on the monitor 5. If the still image is not a desired one, the operator then depresses the next search key to continue the search operation.

Next, the print operation of the recording/reproducing apparatus of this embodiment will be described.

Upon depression of the print key of the operation unit 6 of the recording/reproducing apparatus by the operator, the system control unit 7 sends the mark M2 search instruction to the recording and reproducing unit 11. The recording and reproducing unit 11 starts a magnetic tape reproduction operation, and temporarily stops this operation when the mark M2 is detected from the magnetic tape 2. At this time, the recording and reproducing unit 11 reproduces the red component signal as the luminance signal and sends it to the printing frame memory unit 12. Next, the system control unit 7 sends a writing instruction to the printing frame memory 12. In response to this, the printing frame unit 12 stores the image signal of one frame supplied from the recording and reproducing unit 11.

Next, the system control unit 7 sends a read instruction to the printing frame memory unit 12. In response to this, the printing frame memory unit 12 reads the stored image signal of one frame and sends it to the conversion unit 13. The system control unit 7 then sends a conversion instruction to the conversion unit 13. In response to this, the conversion unit converts the image signal sent from the printing frame memory unit 12 into a print code and sends it via the output terminal to the print device 4.

Next, the system control unit 7 sends the mark M3 search instruction to the recording and reproducing unit 11. In response to this, the recording and reproducing unit 11 starts a magnetic tape reproduction operation, and temporarily stops this operation when the mark M3 is detected from the magnetic tape 2. At this time, the recording and reproducing unit 11 reproduces the green component signal as the luminance signal and sends it to the printing frame memory unit 12. Next, the system control unit 7 sends a writing instruction to the printing frame memory unit 12. In response to this, the printing frame unit 12 stores the image signal of one frame supplied from the recording and reproducing unit 11.

Next, the system control unit 7 sends a read instruction to the printing frame memory unit 12. The printing frame memory unit 12 reads the stored image signal of one frame and sends it to the conversion unit 13. The system control unit 7 then sends a conversion instruction to the conversion unit 13. The conversion unit converts the image signal sent from the printing frame memory unit 12 into a print code and sends it via the output terminal to the print device 4.

Next, the system control unit 7 sends the mark M4 search instruction to the recording and reproducing unit 11. The recording and reproducing unit 11 starts a magnetic tape reproduction operation, and temporarily stops this operation when the mark M4 is detected from the magnetic tape 2. At this time, the recording and reproducing unit 11 reproduces the blue component signal as the luminance signal and sends it to the printing frame memory unit 12. Next, the system control unit 7 sends a writing instruction to the printing frame memory unit 12. In response to this, the printing frame unit 12 stores the image signal of one frame supplied from the recording and reproducing unit 11.

Next, the system control unit 7 sends a read instruction to the printing frame memory unit 12. The printing frame memory unit 12 reads the stored image signal of one frame and sends it to the conversion unit 13. The system control unit 7 then sends a conversion instruction to the conversion unit 13. The conversion unit converts the image signal sent from the printing frame memory unit 12 into a print code and sends it via the output terminal to the print device 4.

Next, the system control unit 7 sends the mark M1 search instruction to the recording and reproducing unit 11. The recording and reproducing unit 11 starts a magnetic tape reproduction operation, and temporarily stops this operation when the mark M1 is detected from the magnetic tape 2. At this time, a color still image is sent from the recording and reproducing unit 11 to the monitor 5 via the monitor terminal 15.

As described so far, according to the present embodiment, the camera unit 8 photoelectrically converts the image of a subject H to generate an image signal, the image signal is stored in the photographing frame memory unit 9, the image processing unit 10 generates a luminance signal and color signals from the image signal, the recording and reproducing unit 11 affixes the type identification mark to the luminance signal and color signals, and records them on the magnetic tape by a predetermined amount of consecutive frames. Accordingly, even if format for the moving image recording and reproducing is used, the degradation of an image quality to be caused by image data compression can be minimized while retaining the bandwidth of color signals. A sufficient image quality can be obtained even when the image is printed.

In the above-described embodiment, the camera unit 8 uses RGB (red, green and blue) color separation filters to generate the red, green and blue component signals in order to record a still image signal on the magnetic tape. Instead of the RGB color separation filters, the camera unit 8 may use YMC (yellow, magenta and cyan) color separation filters of complementary colors to generate the yellow, magenta and cyan component signals.

The dynamic range of an image signal is generally believed to be wider with the YMC complementary color filters than with the RGB pure color filters. The number of general printers usable with the YMC signals is now increasing. Therefore, if the printer with the YMC signals is used, it is efficient to use image pickup devices with the YMC complementary color separation filters. However, if the color coordinate system such as RGB signals is used which allows various image processing processes, more versatile apparatuses can be manufactured as compared to the YMC signals. The operations of recording and searching YMC signals are the same as those described above for RGB signals, and the structure shown in FIG. 1 can be applied. Therefore, the description thereof is omitted.

According to the recording apparatus of the embodiment, even if the format for moving image recording and reproducing is used, the degradation of an image quality to be caused by image data compression can be minimized while retaining the bandwidth of color signals. Moreover, according to the embodiment, since a color signal (color space) highly matching a printer is used, a transmission loss of an image signal is small and a sufficient print quality can be obtained.

Further, it is possible to record image data with high precision and without image quality degradation to be caused by the conversion of a color signal, i.e., the conversion of a color coordinate system (color space). In particular, if the color coordinate system such as RGB signals is used which allows various image processing processes, more versatile apparatuses can be manufactured. If YMC signals having a high photographic sensitivity are used, it becomes possible to obtain a print image of the highest quality as a whole.

Many widely different embodiments of the present invention may be constructed without departing from the spirit and scope of the present invention. It should be understood that the present invention is not limited to the specific embodiments described in the specification, except as defined in the appended claims.

What is claimed is:

1. A color image signal recording apparatus comprising:
   forming means for forming a plurality of component signals constituting a color image signal representing a single frame of a color image;
   generating means for generating an identification signal for identifying each of the plurality of component signals formed by said forming means; and recording means for recording the plurality of component signals and the identification signals on a recording medium, said recording means recording each of the plurality of component signals representing the single frame on a plurality of frames of the recording medium.

2. An apparatus according to claim 1, wherein the plurality of components signals include red, green and blue signals.

3. An apparatus according to claim 1, wherein the plurality of components signals include yellow, magenta and cyan signals.

4. An apparatus according to claim 1, wherein the recording medium is a magnetic tape, and said recording means records each component signal of one frame over a plurality of tracks of the magnetic tape.

5. An apparatus according to claim 1, further comprising:

reproducing means for reproducing the plurality of component signals and the identification signal recorded on the recording medium; and outputting means for outputting the plurality of component signals reproduced by said reproducing means to a printer according to the identification signal reproduced by said reproducing means.

6. An apparatus according to claim 1, wherein:

said forming means forms a color image signal containing a luminance signal and two types of color signals, separately from the plurality of component signals; and the identification signal is a signal capable of identifying each of the plurality of component signals, the luminance signal and the color signals.

7. An apparatus according to claim 1, further comprising:

photoelectrical converting means for converting an optical signal corresponding to a subject into an electrical signal, wherein said forming means forms the plurality of component signals from the electrical signal.

8. An apparatus according to claim 7, wherein said photoelectrical converting means has color filters corresponding to the plurality of component signals.

9. An apparatus according to claim 1, wherein said recording means includes a memory capable of storing the plurality of component signals of one frame.

10. A color image signal processing apparatus comprising:

image pickup means for photoelectrically converting a subject image and forming a plurality of component signals constituting a color image signal representing a single frame of the subject image;

generating means for generating an identification signal for identifying each of the plurality of component signals formed by said forming means;

storing means for storing the plurality of component signals and the identification signal in a storage unit, said storing means storing each of the plurality of component signals representing the single frame on a plurality of frames in the storage unit; and outputting means for outputting the plurality of component signals stored in the storage unit to a printer without converting the plurality of component signals into other types of component signals.

11. An apparatus according to claim 10, wherein the plurality of component signals include red, green and blue signals.

12. An apparatus according to claim 10, wherein the plurality of component signals include yellow, magenta and cyan signals.

13. An apparatus according to claim 10, wherein the storage unit is a magnetic tape, and said storing means records each component signal of one frame over a plurality of tracks of the magnetic tape.

14. An apparatus according to claim 10, wherein said image pickup means has color filters corresponding to the plurality of component signals.

15. A color image signal recording apparatus comprising:

imaging means for imaging an object and for obtaining an image signal;

forming means for forming a first image signal, comprising a luminance signal and two types of color signals, and a second image signal, comprising a plurality of color component signals, by using the image signal obtained by said imaging means;

generating means for generating an identification signal for discriminating the first image signal and the second image signal; and recording means for recording the first signal, the second signal and the identification signal on a recording medium.

16. An apparatus according to claim 15, wherein said recording means records the first image signal and the second image signal selectively on a same recording medium.

17. An apparatus according to claim 15, wherein said recording means records on the recording medium the first and second image signals relating to a single frame.

18. An apparatus according to claim 15, wherein the second image signal comprises red, green and blue component signals.

19. An apparatus according to claim 15, wherein the second image signals comprises yellow, magenta and cyan component signals.

20. An apparatus according to claim 15, further comprising:

reproducing means for reproducing the first image signal, the second image signal and the identification signal from the recording medium;

output means for outputting the second image signal to a printer according to the identification signal reproduced by said reproducing means.

21. An imaging apparatus comprising:

imaging means for imaging an object and for obtaining an image signal;

forming means for forming a first image signal, comprising a luminance signal and two types of color signals, and a second image signal, comprising a plurality of color component signals, by using the image signal obtained by said imaging means;

recording means for recording the first signal and the second signal on a recording medium; and mode setting means for setting a mode of said apparatus between a plurality of modes, including a first mode, in which said forming means forms the first image signal and said recording means records the first image signal on the recording medium, and a second mode, in which said forming means forms the second image signal and said recording means records the second image signal on the recording medium.

* * * * *

UNITED STATES PATENT AND TRADEMARK OFFICE
CERTIFICATE OF CORRECTION

PATENT NO.   : 6,157,767
DATED        : December 5, 2000
INVENTOR(S)  : Koichiro Suzuki It is certified that error appears in the above-identified patent and that said Letters Patent is hereby corrected as shown below:

Column 4,
Line 11, "stop" should read -- stops --.
Line 22, "to with" should read -- to record with --.

Column 5,
Line 13, "unit" should read -- unit 13 --.
Line 26, "frame" should read -- frame memory --.
Line 34, "unit" should read -- unit 13 --.
Line 46, "frame" should read -- frame memory --.
Line 34, "unit" (second occurrence) should read -- unit 13 --.

Column 6,
Line 7, "if format" should read -- if the format --; and "the moving" should read -- moving --.

Column 8,
Line 35, "signals" should read -- signal --.

Signed and Sealed this

Second Day of October, 2001

Attest:

NICHOLAS P. GODICI
Attesting Officer    Acting Director of the United States Patent and Trademark Office